United States Patent
Consalvi

(10) Patent No.: US 11,370,164 B1
(45) Date of Patent: Jun. 28, 2022

(54) HIGH SPEED FDM 3D PRINTER WITH CLOSED LOOP MOTION SYSTEM

(71) Applicant: Jacob J. Consalvi, Vienna, VA (US)

(72) Inventor: Jacob J. Consalvi, Vienna, VA (US)

( * ) Notice: Subject to any disclaimer, the term of this patent is extended or adjusted under 35 U.S.C. 154(b) by 79 days.

(21) Appl. No.: 16/908,017

(22) Filed: Jun. 22, 2020

Related U.S. Application Data

(60) Provisional application No. 62/921,600, filed on Jun. 27, 2019.

(51) Int. Cl.

| | |
|---|---|
| *B29C 64/118* | (2017.01) |
| *B29C 64/393* | (2017.01) |
| *B29C 64/236* | (2017.01) |
| *B29C 64/245* | (2017.01) |
| *B29C 64/295* | (2017.01) |
| *B29C 64/209* | (2017.01) |
| *B29C 64/232* | (2017.01) |
| *B29C 64/25* | (2017.01) |
| *B33Y 10/00* | (2015.01) |
| *B33Y 30/00* | (2015.01) |
| *B33Y 50/02* | (2015.01) |

(52) U.S. Cl.
CPC .......... *B29C 64/118* (2017.08); *B29C 64/209* (2017.08); *B29C 64/232* (2017.08); *B29C 64/236* (2017.08); *B29C 64/245* (2017.08); *B29C 64/25* (2017.08); *B29C 64/295* (2017.08); *B29C 64/393* (2017.08); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| | | |
|---|---|---|
| 2015/0306823 A1 | 10/2015 | Askedall et al. |
| 2016/0167309 A1 | 6/2016 | Liu et al. |
| 2016/0339641 A1 | 11/2016 | Ho et al. |
| 2017/0157826 A1 | 6/2017 | Hishiki |
| 2017/0312987 A1 | 11/2017 | Ladanyi |
| 2018/0297290 A1 | 10/2018 | Eyal et al. |
| 2018/0326644 A1 | 11/2018 | Shen et al. |
| 2019/0291184 A1 | 9/2019 | Buller et al. |

(Continued)

OTHER PUBLICATIONS

Laureto et al., 2017, Open Source Multi-Head 3D printer for Polymer-Metal Composite Component Manufacturing (Year: 2017).*

*Primary Examiner* — Alison L Hindenlang
*Assistant Examiner* — Asha A Thomas
(74) *Attorney, Agent, or Firm* — Clause Eight; Michael Catania

(57) ABSTRACT

The present invention and its variations provide a method of Fused Deposition Modeling (FDM) 3D Printing at a high rate of speed, much higher than that of a conventional 3d printer (e.g. 5 meters per second travel, depositing 3 cubic centimeters of material per second). The invention uses a closed loop brushless motor control system to rapidly move a carriage to a precise position. This carriage contains on itself a high-flow-rate hot end, which is a device which can liquify material at a high flow rate, which in turn is used to deposit material onto a heated bed. The printer contains a high-flow-rate extruder, which is a device designed to maximize the friction between a belt and a pulley in order to drive a large amount of material filament through the high-flow-rate hot end onto a bed without slipping.

20 Claims, 10 Drawing Sheets

(56) References Cited

U.S. PATENT DOCUMENTS

2019/0344502 A1 11/2019 Sweeney et al.
2020/0031046 A1 1/2020 Gjovik et al.
2020/0070416 A1 3/2020 Sweeney et al.

* cited by examiner

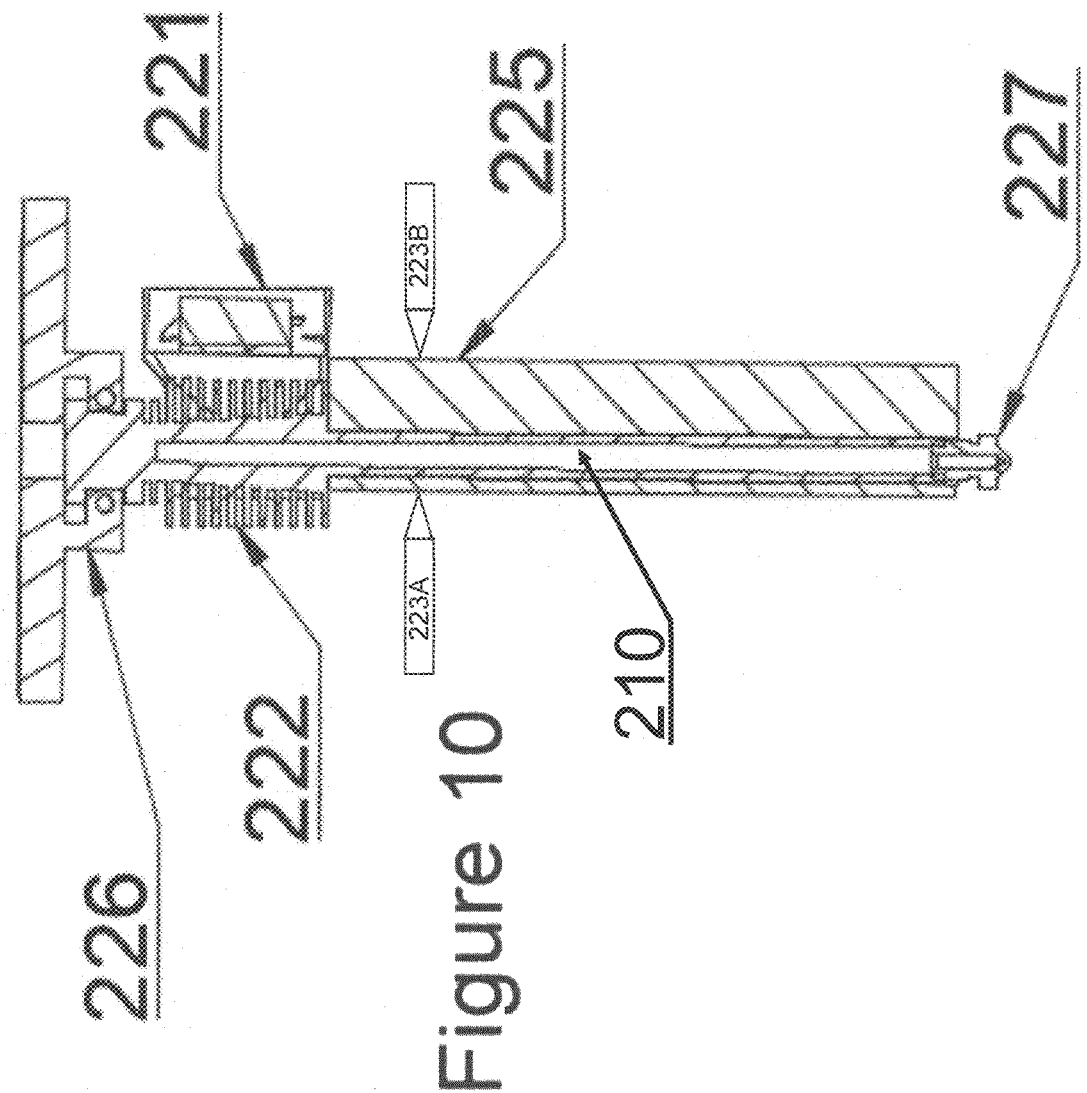

HIGH SPEED FDM 3D PRINTER WITH CLOSED LOOP MOTION SYSTEM

CROSS REFERENCE TO RELATED APPLICATION

The Present Application claims priority to U.S. Provisional Patent Application No. 62/921,600, filed on Jun. 27, 2019, which is hereby incorporated by reference in its entirety

STATEMENT REGARDING FEDERALLY SPONSORED RESEARCH OR DEVELOPMENT

Not Applicable

BACKGROUND OF THE INVENTION

Field of the Invention

The present invention generally relates to fused deposition modeling three-dimensional printers.

Description of the Related Art

Fused deposition modeling (FDM) three-dimensional (3D) printing is the process of manufacturing a 3D object from an electronic file, by depositing molten material, layer by layer, to build up the object. Most FDM 3D printers accept their material in the form of a filament, which is melted in a hot end, then forced through a nozzle. Conventional 3D printers use an extruder which consists of an idler pulley, and a small hobbed pulley driven by a stepper motor to force the filament through the hot end. While this method works for printing at low speeds, the backpressure exerted on the filament by the hot end when printing at high speeds, among other things, causes the hobbed pulley to slip against the filament, cut a groove into the filament, or cause the stepper motor to lose steps, any of which can cause a print failure.

Also, when printing at high speeds, the volume of filament being forced through the hot end absorbs more heat than the hot end can supply, causing the hot end to cool down, and causing a print failure.

Another issue with 3D printing at high speeds is that the time that the filament spends in contact with a conventional hot end is not sufficient for the filament to completely melt. This causes the hot end to jam, which also causes a print failure.

Also, the motion system of a conventional 3D printer uses an open loop control system to drive stepper motors. When printing at high speeds, the rapid accelerations in direction can cause the stepper motors to lose steps. The printer does not try to self correct since the control system is open loop. This causes a print failure, and can even cause damage to the 3D printer.

Thus, there is a need for a FDM 3D printing system that can operate at high speeds without the aforementioned issues.

BRIEF SUMMARY OF THE INVENTION

The present invention provides a method of 3D printing at high speeds (e.g. 5 meters per second travel, depositing 3 cubic centimeters of material per second). The method comprises a motion system that uses a closed loop brushless motor control to rapidly position a carriage which contains a high-flow-rate hot end. The high-flow-rate hot end is optimized to operate at high print speeds by increasing the heat output, increasing the nozzle diameter, and increasing the time that the filament is in contact with the hot end by greatly increasing the size of the melt zone. In a preferred embodiment, multiple heaters are linked together using a number of bored out threaded rods, with a smooth PTFE tube running down the length of the device.

The high-flow-rate hot end is fed material by a high-flow-rate extruder, which is a component that applies force to a material in filament form by guiding the filament through a groove in a pulley by means of a tensioned belt. Since this extruder distributes the load over a large section of filament, the filament is less likely to slip, or cut a groove into the filament. This application of force to the filament allows the extruder to reliably feed the high-flow-rate hot end with sufficient material to print at high speeds. A preferred implementation is to mount the extruder onto the frame of the 3D printer, and to connect it to the high-flow-rate hot end by means of a bowden tube.

One aspect of the present invention is a high speed fused deposition modeling (FDM) three-dimensional (3D) printer assembly. The printer assembly preferably comprises a frame, a main print controller, a plurality of brushless motor controllers, a printing bed positioned on the frame, an XY gantry positioned on the frame above the printing bed and comprising a plurality of brushless motors and a plurality of encoders, an extruder positioned on the frame, and an x-carriage. The x-carriage is positioned on the XY-gantry. The x-carriage comprises a high-flow-rate hot end, an air hose, and a filament tube in communication with the extruder. The high-flow-rate hot end comprises a heat sink, a heater system and a nozzle. The filament from the extruder moves through the filament tube to the high-flow-rate hot end for printing from the nozzle. Each of the plurality of brushless motors of the XY gantry is controlled by the plurality of brushless motors controllers using field oriented control for closed loop positioning to achieve to print at high speeds with high precision using the plurality of encoders to track the location of the x-carriage. The printer assembly preferably has a volumetric flow rate ranging from 240 to 4800 cubic millimeters per second, and operates at a speed ranging from 1 meter per second to 5 meters per second.

Another aspect of the present invention is a high speed fused deposition modeling (FDM) three-dimensional (3D) printer assembly. The printer assembly preferably comprises a frame, a main print controller, a printing bed positioned on the frame, an XY gantry, an extruder and an X-carriage. The XY gantry is positioned on the frame above the printing bed. The XY gantry comprises a string, a plurality of encoders, a plurality linear shafts and a plurality of brushless motors controlled by the main print controller. The extruder is preferably positioned on the frame. The extruder comprises a timing belt, a passive wheel with a groove, an input channel lined with a PTFE tube, and an output channel lined with a PTFE tube. The x-carriage is positioned on the plurality of linear shafts of the XY-gantry. The x-carriage comprises a high-flow-rate hot end, an air hose, and a filament tube in communication with the output channel of the extruder. The high-flow-rate hot end comprises a heat sink, a heater system and a nozzle. The filament enters the extruder through the input channel and is compressed between the timing belt and the groove of the passive wheel before exiting the output channel. The filament from the output channel moves through the filament tube to the high-flow-rate hot end for printing from the nozzle. Each of the plurality of brushless motors of the XY gantry is controlled by the plurality of brushless motors controllers using field oriented control for closed loop positioning to print at high speeds with high precision using the plurality of encoders to track the location of the x-carriage. The printer assembly preferably has a volumetric flow rate ranging from 240 to 4800 cubic millimeters per second, and operates at a speed ranging from 1 meter per second to 5 meters per second.

Yet another aspect of the present invention is a method for printing using a high speed fused deposition modeling (FDM) three-dimensional (3D) printer assembly. The method includes moving filament into an input channel of an extruder of a printer assembly, the extruder positioned on a frame of the printer assembly. The method also includes compressing the filament between a timing belt and a groove of a passive wheel of the extruder. The method also includes moving the filament from an output channel of the extruder through a filament tube to a high-flow-rate hot end of an x-carriage positioned on an XY gantry of the printer assembly. The method also includes melting the filament in a melt zone of the high-flow-rate hot end of an x-carriage. The method also includes positioning the x-carriage using a plurality of brushless motors of the XY gantry which are controlled by a main print controller using field oriented control for closed loop positioning to achieve to print at high speeds with high precision using a plurality of encoders to track the location of the x-carriage. The method also includes printing the melted filament material from a large bore nozzle of the high-flow-rate hot end of the x-carriage at a volumetric flow rate ranging from 240 to 4800 cubic millimeters per second, and a speed ranging from 1 meter per second to 5 meters per second.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 10 is an isolated cross-sectional view of the melt zone of the hot end of the x-carriage of the high speed FDM 3D printer assembly.

DETAILED DESCRIPTION OF THE INVENTION

The present invention provides a method for fused deposition modeling (FDM) 3D printing at a high rate of speed. The invention makes several improvements upon a conventional 3D printer. It improves upon the motion system, extruder, hot end, and part cooling of a conventional 3D printer.

Figure 1:
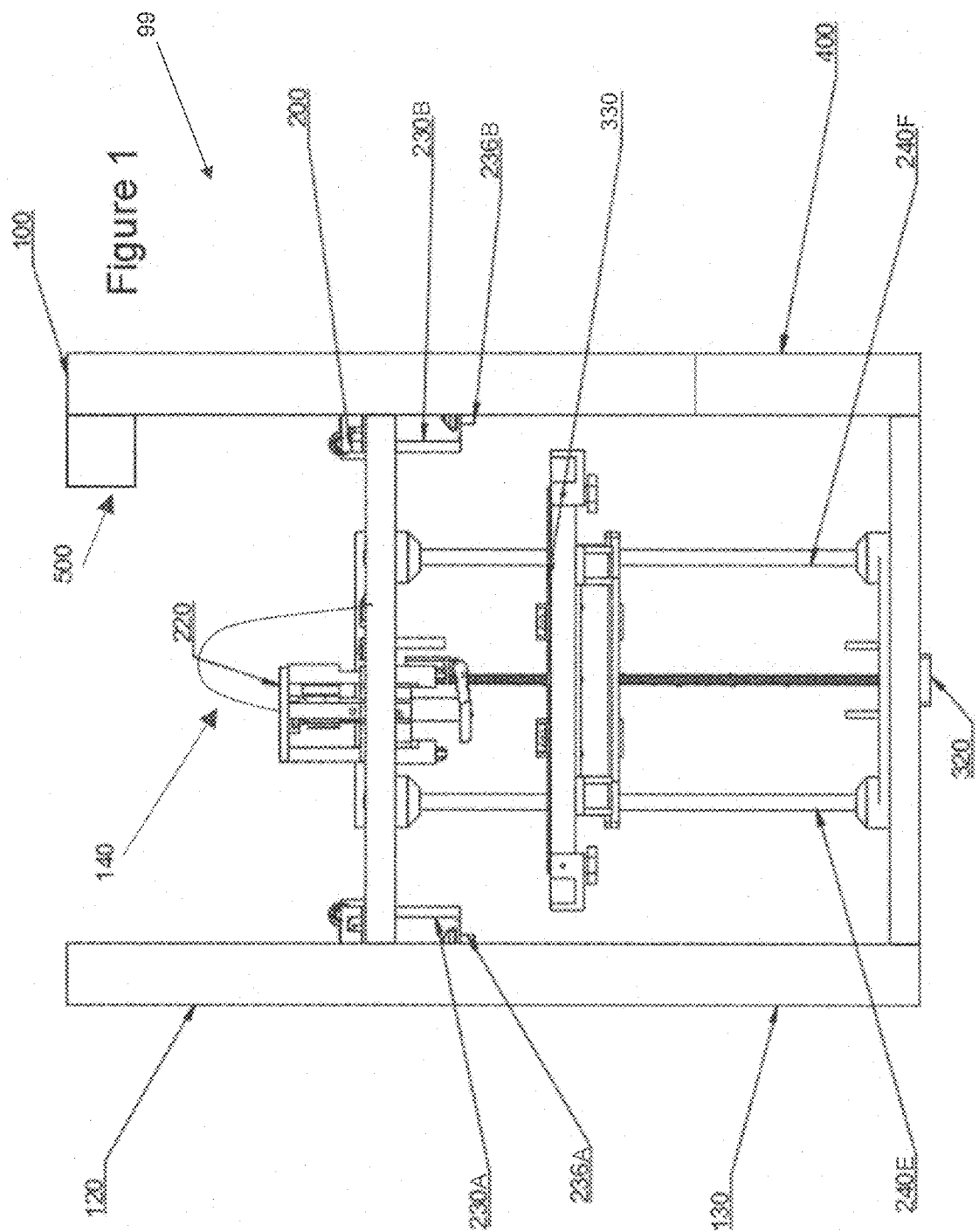
FIG. 1 is a front view of high speed fused deposition modeling (FDM) three-dimensional (3D) printer assembly.

FIG. 1 is an illustration of a preferred embodiment of an FDM 3D printer assembly 99. The printer assembly 99 preferably comprises a frame 100, a main print controller 120, a BLDC controller 130, a printing bed 330 positioned on the frame 100, an XY gantry 200, a stepper motor 320, a power supply 400, an extruder 500, and an X-carriage 220 with an air hose 140. The XY gantry 200 is positioned on the frame 100 above the printing bed 330. The XY gantry 200 preferably comprises encoders 236A and 236B and a brushless motors 230A and 230B. As shown in FIG. 1, Z-linear shafts 240E and 240F support the kinematic bed mounting 335 and the print bed 330.

Figure 2:
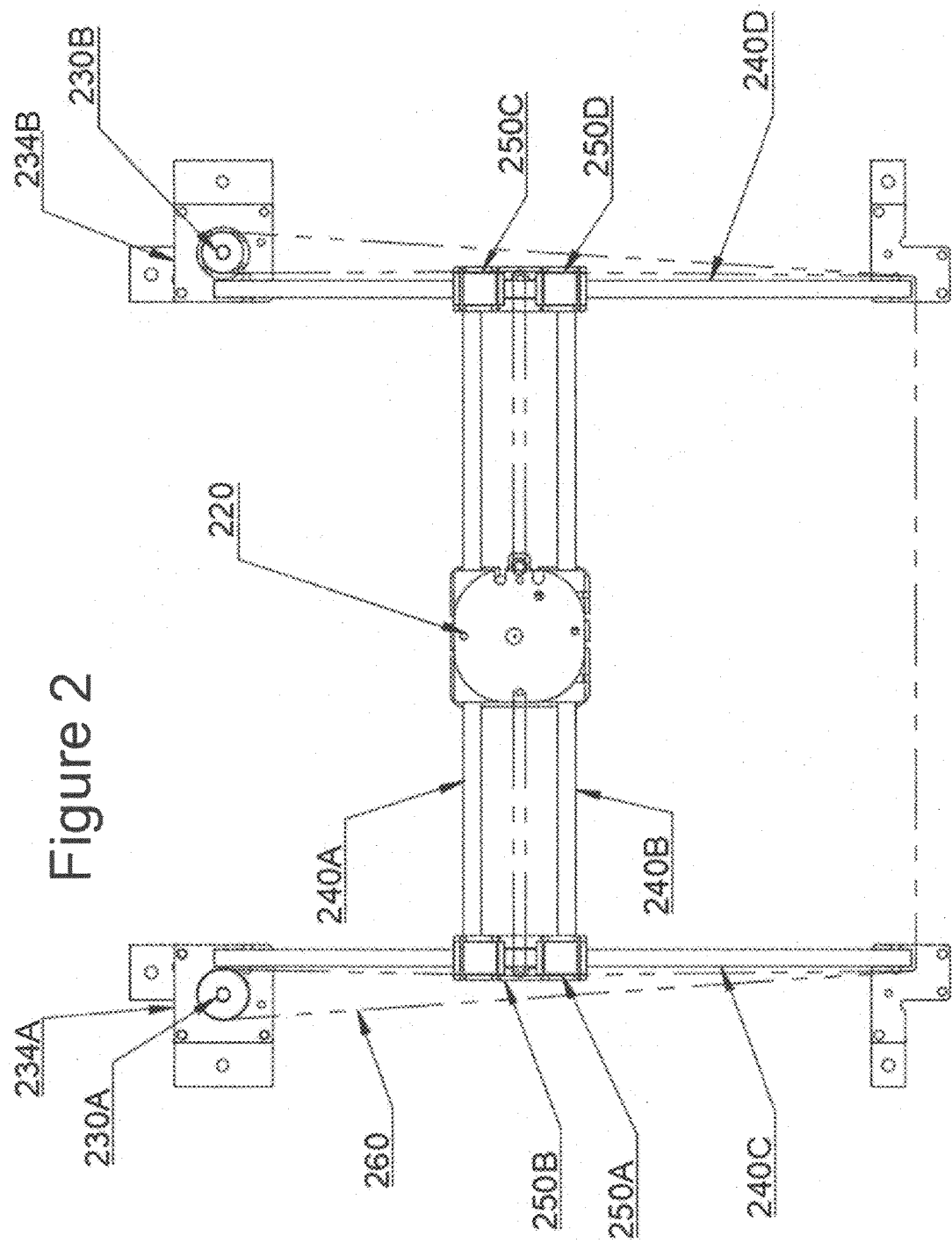
FIG. 2 is a top view of the x and y axis motion system of the XY gantry.

FIG. 2 is a top view of the x and y axis motion system of the XY gantry 200. The XY gantry 200 comprises X-linear shafts 240A and 240B with linear bearings 250A, 250B, 250C and 250D, and Y-linear shafts 240C and 240D, for support of the movement of the x-carriage 220. The x-carriage 220 is positioned on the linear shafts 240A and 240B of the XY-gantry 200. Two BLDC motors 230A and 230B, each with a respective motor case 234, which engage a string medium 260, are utilized to move the x-carriage in x and y movements during the printing operation. The x-carriage 220 has linear bearings 250. The string medium 260 is preferably a KEVLAR string, UHMWPE string, or other string or belt with similar properties. The string 260 is the medium that transmits the force provided by the motors 230A and 230B into motion of the x-carriage 220 in the xy plane. The printer assembly 99 uses the medium in a core XY motion system to minimize the moving mass. The string medium 260 should stretch as little as possible so it can efficiently and accurately move the x-carriage 220 along the X-linear shafts 240a and 240B and the Y-linear shafts 240C and 240D.

Figure 3:
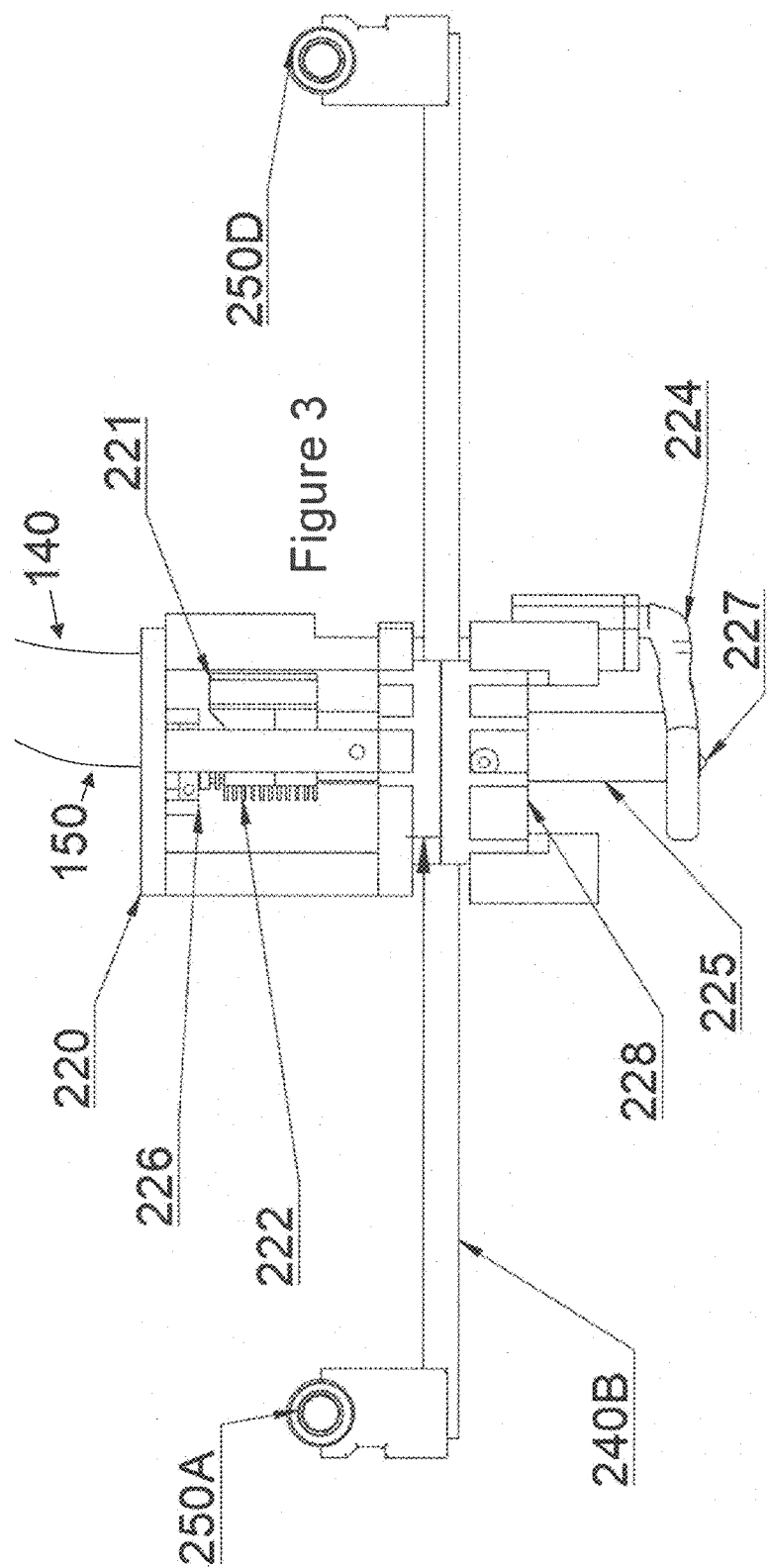
FIG. 3 is a front view of the x-axis and high flow rate hot end.

FIG. 3 is a front view of the x-axis and high flow rate hot end of the x-carriage 220 on X-linear shaft 240B with linear bearings 250A and 250D. The high flow rate hot end of the x-carriage 220 preferably comprises a fan 221, a heat sink 222, a first heater system 225, a melt zone 210, a compressed air part cooler 224, a heat sink mount 226, and a large bore nozzle 227. The air hose 140 flows compress air from a compressed air source (not shown and preferably attached to the frame 100) to the compressed air part cooler 224. The filament tube 150 receives the filament material from the extruder 500 for heating in the high flow rate hot end of the x-carriage 220 and printing/depositing from the large bore nozzle 227 onto the print bed 330. A touch probe holder 228 is positioned in relation to the nozzle 227.

Figure 4:
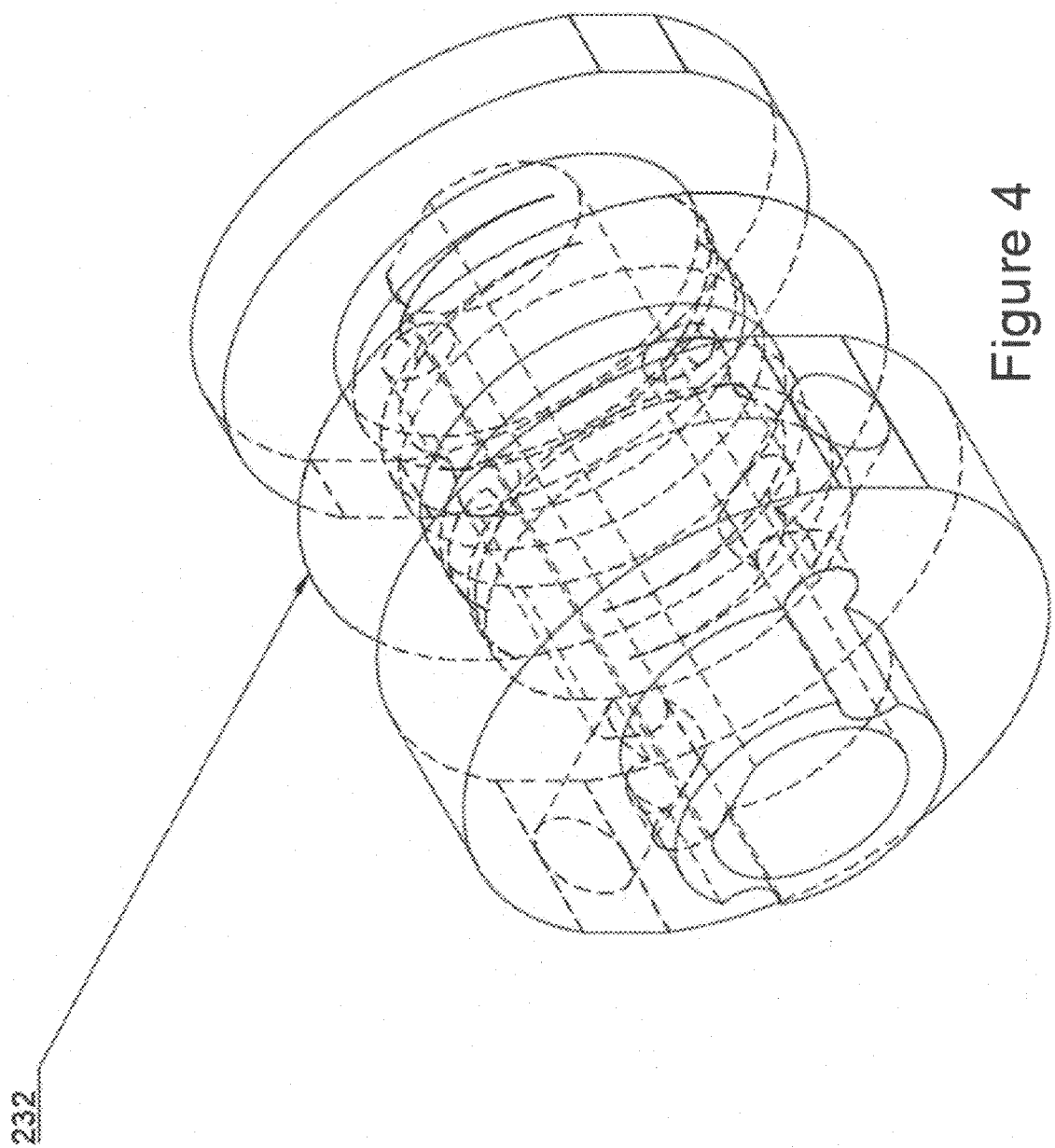
FIG. 4 is a perspective view of a pulley.

FIG. 4 is a perspective view of a pulley 232 of the XY gantry 200.

Figure 5:
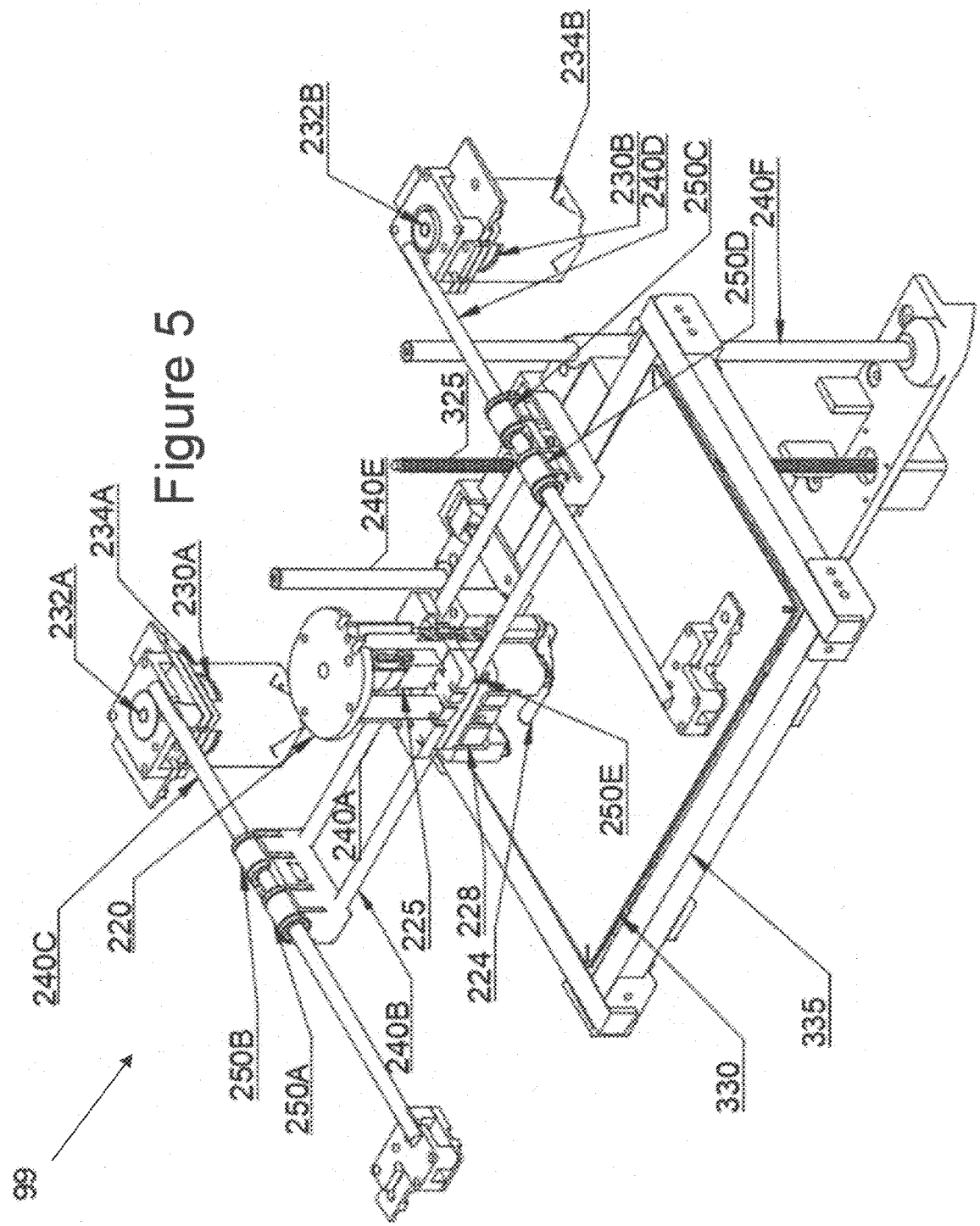
FIG. 5 is a perspective view of the high speed FDM 3D printer assembly without the frame.

FIG. 5 is a perspective view of the high speed FDM 3D printer assembly 99 without the frame 100. The XY gantry 200 is composed of linear shafts 240, pulleys 232a and 232B, and BLDC motors 230A and 230B. The x-carriage 220 is positioned above the print bed 330 which is mounted on the kinematic mounting 335. The x-carriage 220 has a touch probe holder 228 positioned in relation to the nozzle 227.

The XY-gantry 200 comprises X-linear shafts 240A and 240B, Y-linear shafts 240C and 240D, linear bearings 250A, 250B, 250C and 250D, brushless direct current motors 230A and 230B, encoders 236A and 236B, motor cases 234A and 234B, pulleys 232A and 232B, motor shafts 231, string alignment 233, string 260, and an x-carriage 220. The XY gantry 200 implements the core XY kinematics for the printer assembly 99. The present implementation of the core XY kinematics improves upon a conventional 3D printer motion system by using a string medium 260, preferably a UHMWPE string medium (other types of string will also work) instead of gt2 timing belts to prevent stretching and belt skipping that occur when printing at high speeds using a conventional 3D printer. The present implementation of the core XY kinematics further improves upon a conventional 3D printer motion system by also using brushless motors 230A and 230B controlled using a main print controller 120 capable of using field oriented control to achieve extremely high speeds with high precision, and by using encoders 236A and 236B to precisely keep track of the location of the x-carriage 220, which give positional feedback to the brushless motor controllers. One of the requirements for the pulleys 232A and 232B is that the string medium 260 does not wind over itself while it is spooling up. This is to prevent the radius of the pulley 232 from changing which causes unwanted and unpredictable acceleration. One implementation of such a pulley 232 is illustrated in FIG. 4. This method works by having the string medium 260 partially routed internally through the pulley 232, which prevents the string medium 260 from winding over itself.

The print bed 330 is mounted on the kinematic mounting 335, which is supported by the Z-linear shafts 240E and 240F, and moved in a vertical manner using the lead screw 325.

As shown in FIG. 5, the x-carriage 220 has the compressed air part cooler 224, the heater system 225, and the touch probe holder 228. The entire x-carriage 220 is designed to support the high-flow-rate hot end, and keep the high-flow rate hot end as stable as possible. The nozzle 227 in the present implementation of the high-flow-rate hot end has a nozzle diameter of preferably 0.8 mm, and the length of the melt zone 210 is optimized for a print speed of 5000 mm/s. To calculate the length of a preferred embodiment of the melt zone, the following equation was derived:

$$\sqrt{\frac{TargetFlowRate}{20.16}} * 13.97$$

A targetFlowRate is in mm^3/second, and the result is the length in millimeters of the melt zone 210. In one embodiment, for a 1.75 millimeter (mm) filament, the melt zone ranges from 80-160 mm. In addition to calculating the length of melt zone, its vertical position in the x-carriage 220 should also be determined. To do this, the center of mass of the high-flow-rate hot end is calculated, and the high-flow-rate hot end is positioned in a way, such that the center of mass of the high-flow-rate hot end is on the same plane as the x and y axis. This is done to reduce any rotational forces on the x-carriage 220 during operation of the printer assembly 99. Since the melt zone 210 is longer than a melt zone of a conventional 3D printer, the melt zone 210 of the x-carriage 220 of the printer assembly 99 is supported in multiple locations. As shown in FIG. 10, a preferred embodiment uses steel stabilizing rods 223A and 223B ground to a point, that contact the high-flow-rate hot end at its center of mass, in order to increase its stability. This is necessary in order to prevent the nozzle 227 from making unwanted movements during acceleration or deceleration of the x-carriage 220. The heat sink 222 of the x-carriage 220 is mounted on the heat sink mount 226 and the fan 221 is positioned in relation to the heat sink 222 to assist in the removal of heat during the printer operation.

The x-carriage 220 is designed to be as light as possible, so the part cooling fan/compressed air source is preferably mounted to the frame 100 of the printer assembly 99 instead of mounted to the x-carriage, as is done in a conventional 3D printer. The compressed air travels to the x-carriage 220 via an air hose 140, where it enters the compressed air part cooler 224. There, the compressed air is directed to blow directly below the nozzle 227 of the high-flow-rate hot end. The x-carriage 220 contains a touch probe holder 228 which can be used to mount any form of probe used for automatic leveling of the print bed 330.

Figure 6:
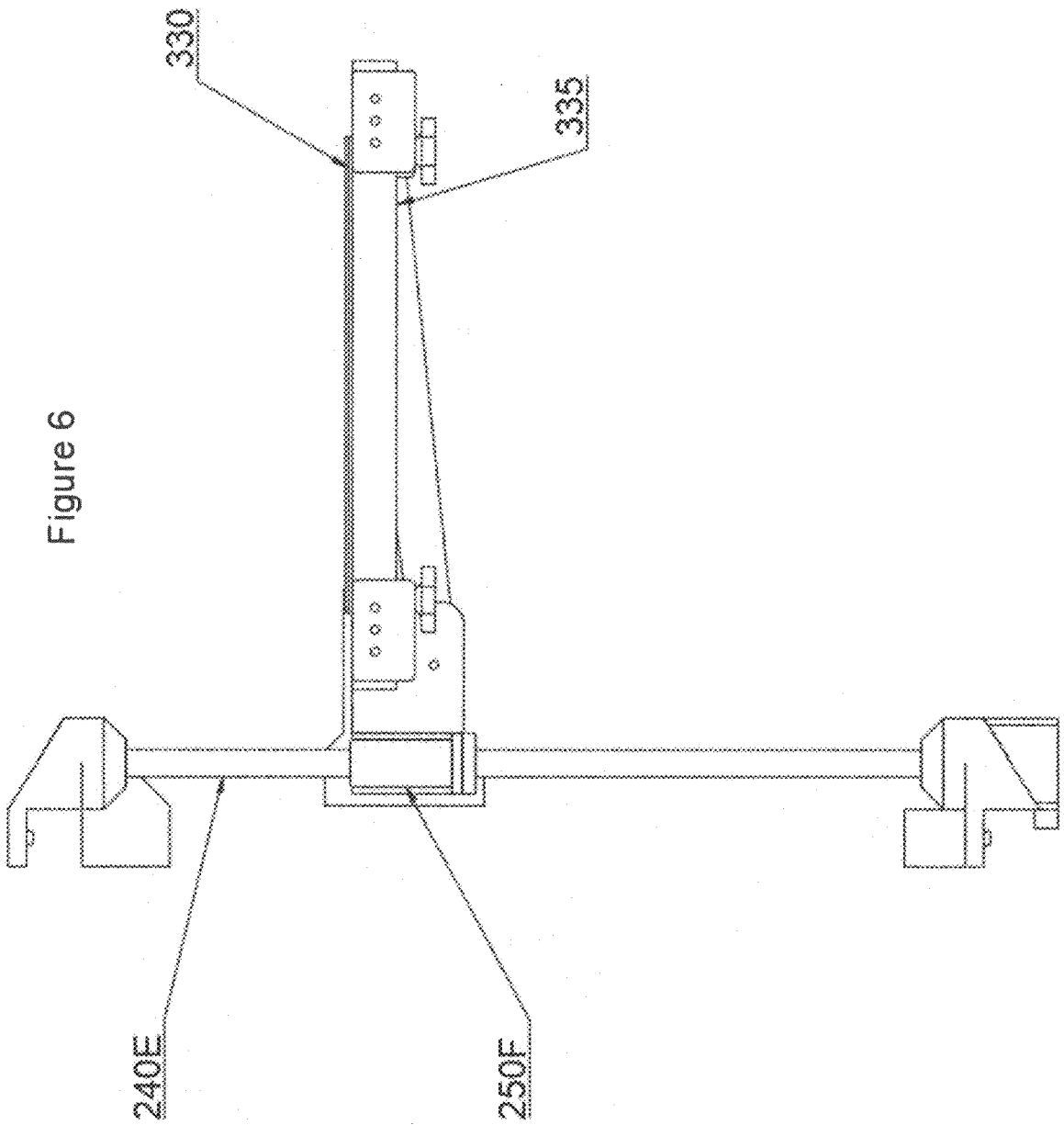
FIG. 6 is a side view of the z-axis.

FIG. 6 is a side view of the z-axis of the printer assembly 99 showing the print bed 330, with the kinematic mounting 335, connected to a linear bearing 250F on the Z-linear shaft 240E. The z-axis of the printer assembly 99 preferably comprises the print bed 330, the kinematic bed mounting 335, the lead screw 325, the stepper motor 320, and linear rails/shafts 240E and 240F. An improvement over a conventional 3D printer is the use of kinematic mounting with a preload. Such a mounting system restricts all of the degrees of freedom of the print bed 335. This increases the positional accuracy of the print bed 335, which increases the reliability of the printer assembly 99.

Figure 7:
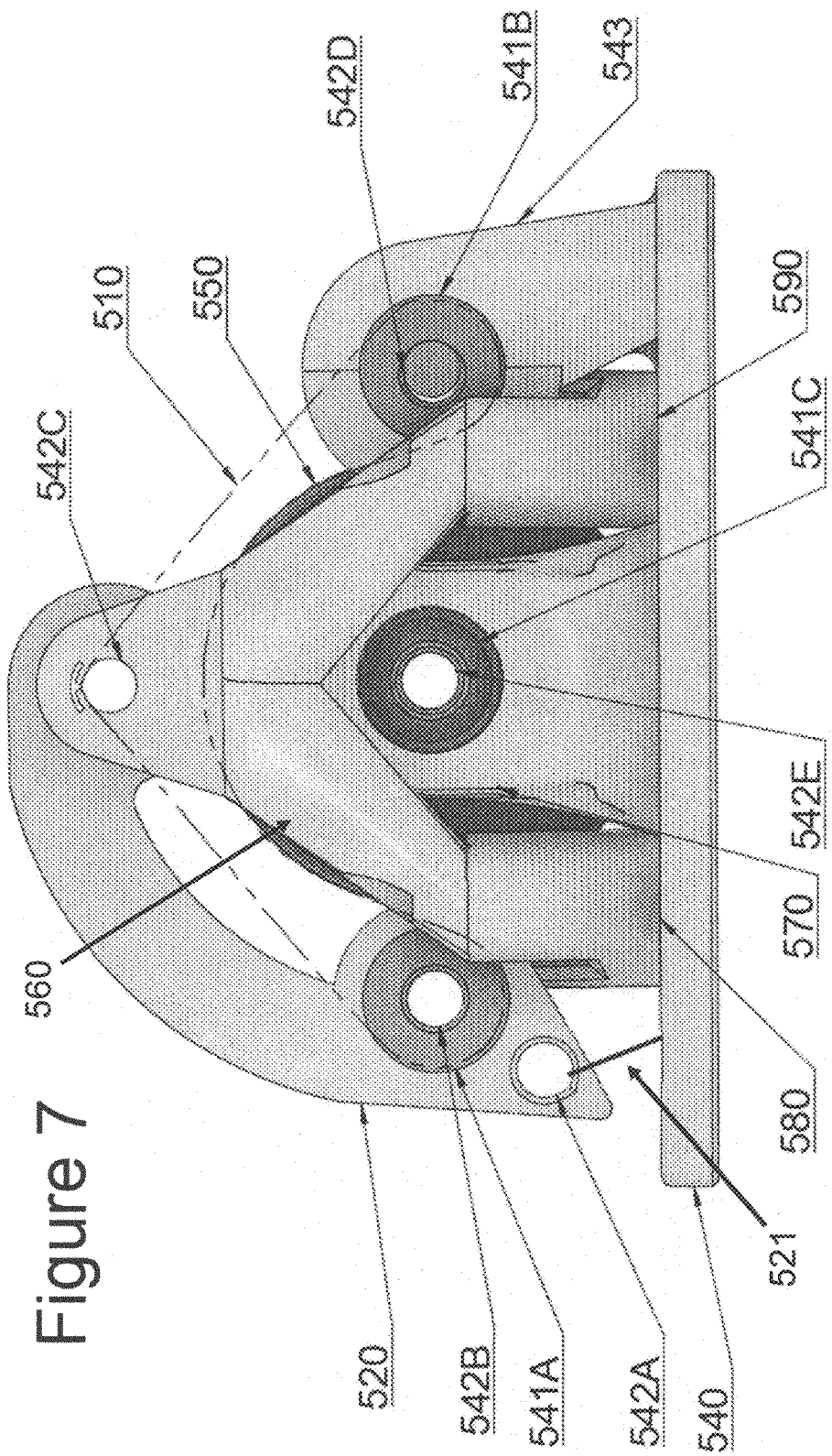
FIG. 7 is a side view of the high flow rate extruder.
Figure 8:
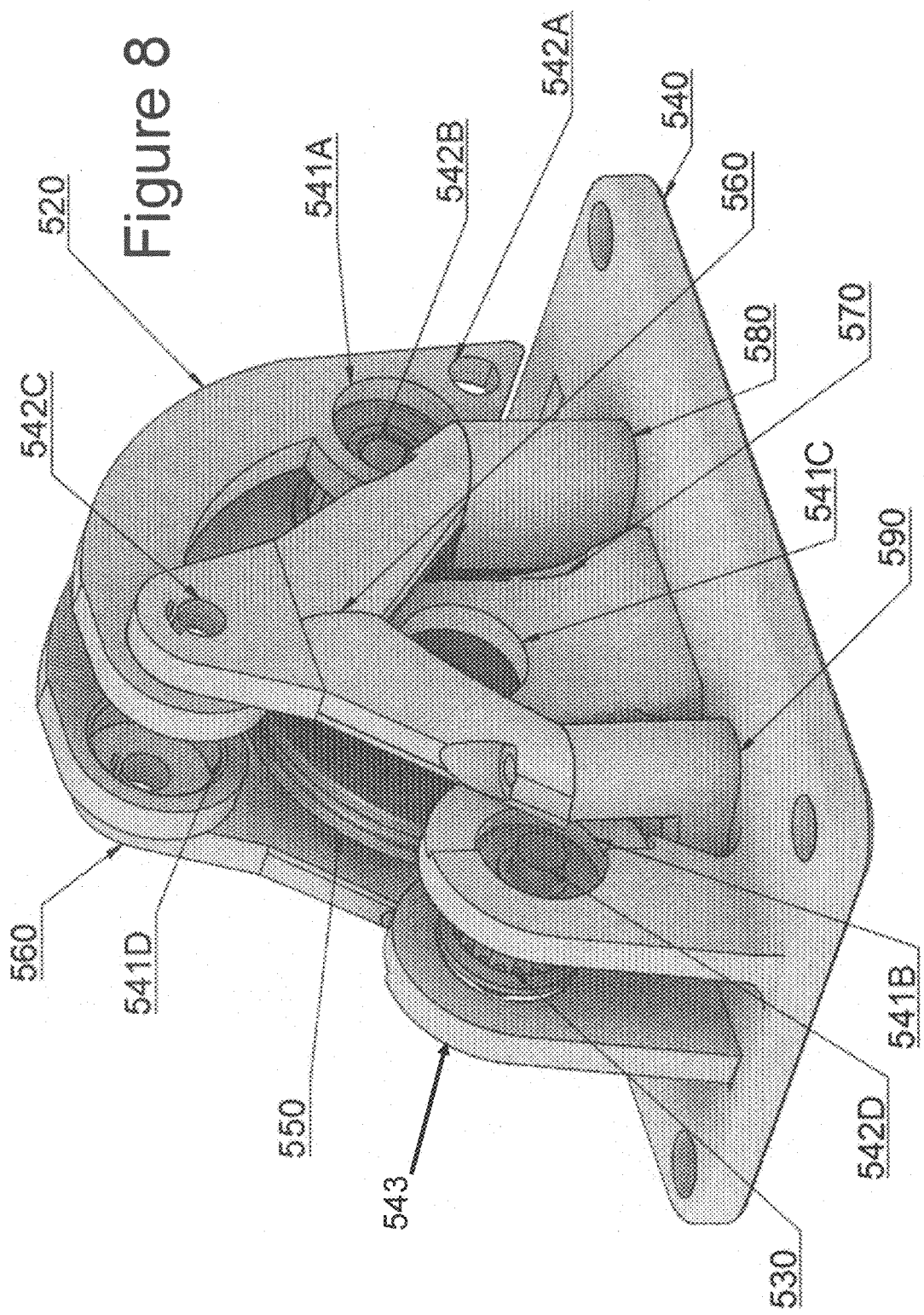
FIG. 8 is a perspective view of the high flow rate extruder.

The high-flow-rate extruder 500 is illustrated in FIGS. 7 and 8. The high-flow-rate extruder 500 preferably comprises a gt2 timing belt 510, a tensioning arm 520, elastic material 521, two belt pulleys 530, a base 540, location for bearings 541A and 541B, location for a shafts 542A, 542B, 542C, 542D, and 542E, driven pulley holder 543, a passive wheel 550, tension arm support 560, passive wheel support 570, filament input channel 580, and filament output channel 590. This high-flow-rate fixes the filament slippage and other problems of a conventional extruder described above in paragraph 2 by greatly increasing the area that the extruder contacts the filament. The extruder 500 achieves this by contacting the filament without the use of a hobbed gear, instead using a gt2 timing belt 510 to press the filament against a passive wheel 550. This passive wheel 550 has a groove in it of a slightly larger diameter than the filament, which prevents the filament from coming off of the wheel. As the filament enters the high-flow-rate extruder via the filament input channel 580, the filament is guided to a location where the filament becomes squeezed between the gt2 timing belt 510 and the passive wheel 550. The filament is preferably forced around the passive wheel 550 for 3.10669 radians where the filament goes into the filament output channel 590, where the filament exits the high-flow-rate extruder 500. Both the filament input channel 580 and the filament output channel 590 are preferably lined with a PTFE tube, and are designed to accept M10 pneumatic fittings. This design eliminates any filament slippage, and prevents the filament from being damaged by the extruder 500.

Figure 9:
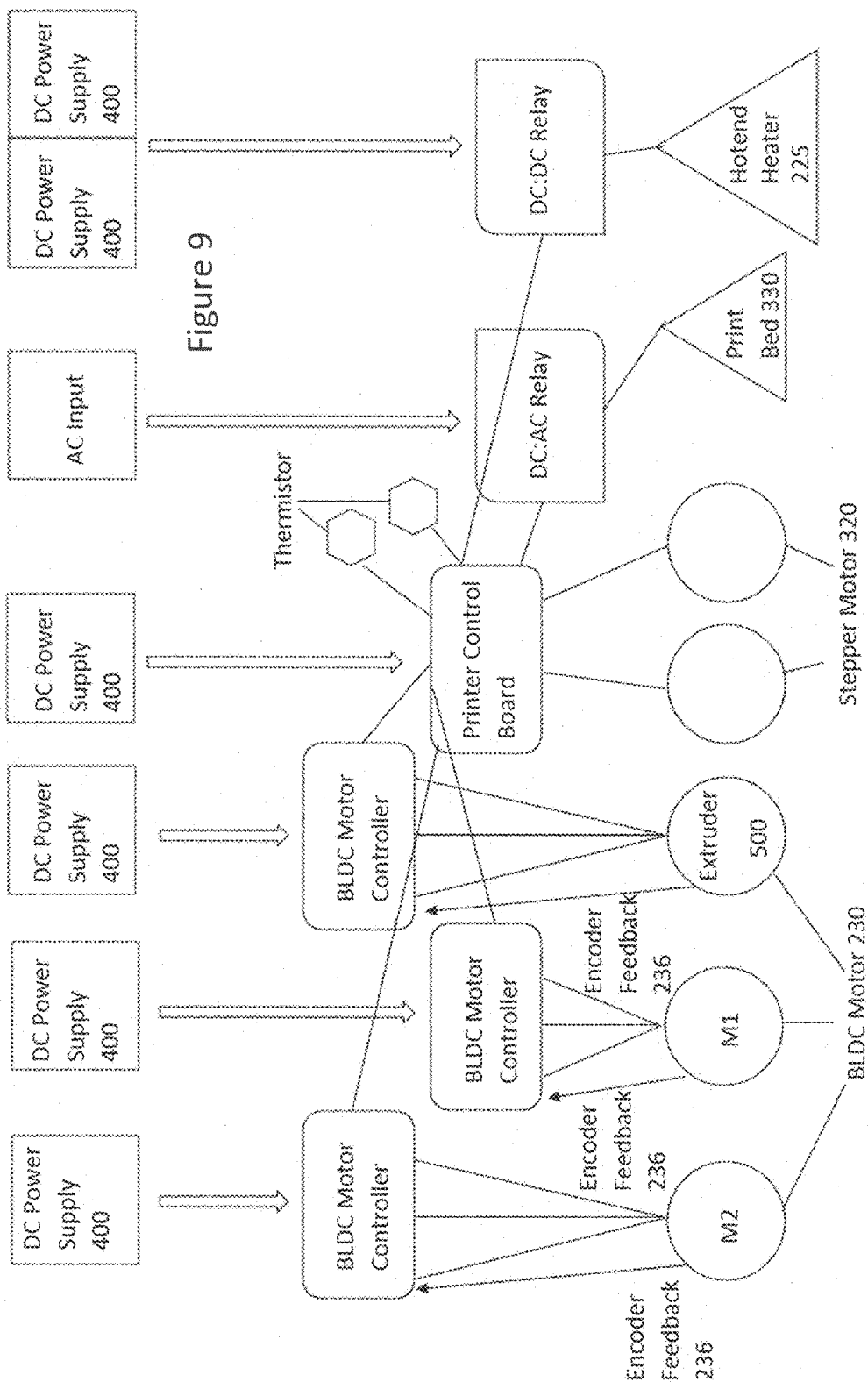
FIG. 9 is a flow graph showing the connectivity between electronic components.

FIG. 9 is a flow graph showing the connectivity between electronic components and illustrates the electronics of a preferred embodiment of the present invention. The electronics preferably comprise six conventional DC power supplies 400, one AC power supply, or wall socket, three brushless dc motor controllers, three brushless DC motors 230, two stepper motors 320, one main printer control board, two thermistors, one DC:DC relay, one DC:AC solid state relay, one AC heater 225, and a the print bed 330. A requirement for the brushless motor controllers, is that they must be capable of field oriented control, and any form of closed loop positioning. The brushless DC motor controllers and the main printer control board must have a common interface method by which to communicate. The firmware of the main printer control board must support, or be re-written to support communication with the brushless motor controllers. Since the present implementation of the high-flow-rate hot end draws a large amount of power, the printer assembly 99 preferably uses two conventional power supplies to power it, and control it via a relay instead of powering it directly off of the main printer control board, as is conventionally done. Because of the use of a relay to control the hot end heaters, the PID frequency must be changed to take into account the maximum number of switches per second the relay is capable of achieving.

The main printer controller 120 preferably communicates with the motor controllers 130 utilizing UART.

Feedback from the encoders 236 is constantly used to control the position and velocity of the BLDC motors 230. The main print controller 120 gives the motor controller 130 a target position and velocity. Then, the motor controller 130 uses a PID controller which constantly takes in input from the encoders 236 to determine how fast to turn the motor 230, and with the appropriate torque. Since the BLDC motor controllers 230 use field-oriented control, the encoder feedback is also used to determine the rotor position, which is used to apply current to each of the BLDC motors 230 phases to generate a magnetic field in an optimal orientation inside the motors 230. Using field-oriented control increases both the efficiency and torque of the motor 230.

The printer assembly 99 preferably has a speed ranging from 1 to 5 meters per second.

The printer assembly 99 preferably has a volumetric flow rate ranging from 240 to 4800 cubic millimeters per second.

The printer assembly 99 is preferably capable of printing at high speeds using 3D printable materials such as PLA, PETG, ASA and nylon.

The printer assembly 99 preferably uses a large bore 3D printer nozzle that is 1.0 mm in diameter. The diameter of the nozzle is dependent on the target print speed, and the amount of force that the extruder system can consistently exert on the filament. The nozzle diameter of a conventional 3D printer is 0.4 mm. However, the range of standard nozzles varies from 0.15-0.8 mm, with specialized nozzles going up to 1.4 mm. The printer assembly 99 preferably uses specialized nozzles to reduce the backpressure caused by the constriction of flow in the nozzle 227, which makes it easier to achieve high volumetric flow rates.

The length of an axis of the printer assembly 99 can be increased by increasing the length of the linear rods 240, and perhaps increase their diameter appropriately. Preferably, all of the linear rods 240 range from 100 mm to 600 mm, and most preferably are 400 mm long, and the travel of each of the axis is about 350 mm long.

The compressed air source is simply one method of providing the airflow to rapidly cool the molten plastic, which has been extruded from the hot end. The present implementation uses 30 psi air, which runs through the air hose 140 to the x-carriage 220, and then to the compressed air part cooler 224 used to direct the air below the nozzle 227. Any method of providing a sufficient flow of air to the space below the hot end could be substituted, however it should be noted that a conventional part cooling system does not provide adequate air flow to cool the molten plastic while printing at high speeds.

The closed loop motion system is preferably comprised of the two brushless DC (BLDC) motors 230A and 230B, a field-oriented motor controller 130 for each motor 230, and an encoder 236 for each motor 230. A traditional 3D printer uses an open loop system, which in the context of a 3D printer, means that the 3D printer controller does not know where the print head is, only where it instructed it to go. While this works at lower speeds, the force required to accelerate and decelerate the hot end would cause a traditional open loop stepper motor based system to lose its positional accuracy, causing print failure. The encoders 236A and 236B provide positional feedback to the motor controllers 130, which enables them to compensate for any forces acting on the hot end that would otherwise cause the print to fail. With a properly calibrated closed loop system, the hot end will always be exactly in the correct position, and thereby will enable the printer assembly 99 to print at higher speeds with higher accelerations.

A preferred embodiment of the present invention has been described in detail for the purpose of illustration. It is understood that variations can be made by a person skilled in the art, without deviating from the scope of the present invention. For example, the described implementation of the invention uses a variation of the core XY kinematics, but it is understood that the same principles of the present implementation can be applied to any another type of 3D printer kinematics.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim as my invention the following:

1. A high speed fused deposition modeling (FDM) three-dimensional (3D) printer assembly comprising:
   a frame;
   a main print controller;
   a printing bed positioned on the frame;
   an XY gantry positioned on the frame above the printing bed, the XY gantry comprising a string medium, a plurality of encoders, a plurality linear shafts and a plurality of brushless motors;
   an extruder positioned on the frame, the extruder comprising a timing belt, a passive wheel with a groove, an input channel lined with a PTFE tube, and an output channel lined with a PTFE tube; and
   an x-carriage positioned on the plurality of linear shafts of the XY-gantry, the x-carriage comprising a high-flow-rate hot end, an air hose, and a filament tube in communication with the output channel of the extruder, wherein the high-flow-rate hot end comprises a heat sink, a heater system and a nozzle;
   wherein the extruder is configured to receive filament through the input channel, configured to compress the filament between the timing belt and the groove of the passive wheel, and configured to pass the compressed filament through the output channel;
   wherein the filament tube is configured to receive the filament from the output channel and pass the filament to the high-flow-rate hot end for depositing from the nozzle;
   wherein each of the plurality of brushless motors of the XY gantry is controlled by using field oriented control for closed loop positioning to print at high speeds with high precision using the plurality of encoders to track the location of the x-carriage;

wherein the printer assembly has a volumetric flow rate ranging from 240 to 4800 cubic millimeters per second, and operates at a speed ranging from 1 meter per second to 5 meters per second.

2. The printer assembly according to claim 1 wherein the XY gantry further comprises a plurality of brushless motor controllers wherein the plurality of encoders provide positional feedback to the plurality of brushless motor controllers.

3. The printer assembly according to claim 1 further comprising a compressed air source mounted to the frame and in flow communication with the air hose of the x-carriage to flow compressed air directly below the nozzle during printing.

4. The printer assembly according to claim 1 wherein the high-flow rate hot end defines a melt zone having a length ranging from 80 millimeters to 160 millimeters.

5. The printer assembly according to claim 1 wherein the x-carriage further comprises a plurality of stabilizing rods that contact the high-flow-rate hot end at its center of mass to increase its stability.

6. The printer assembly according to claim 1 wherein the nozzle has a bore diameter ranging from 1.0 millimeters to 1.4 millimeters.

7. The printer assembly according to claim 1 wherein the string medium is a KEVLAR string or a UHMWPE string.

8. The printer assembly according to claim 1 wherein the main printer controller comprises a firmware which supports communication with the plurality of brushless motor controllers.

9. The printer assembly according to claim 1 the extruder further comprises a base, a plurality of pulleys, a tensioning arm, a tension arm support, a passive wheel support and a driven pulley holder.

10. A high speed fused deposition modeling (FDM) three-dimensional (3D) printer assembly comprising:
    a frame;
    a main print controller;
    a printing bed positioned on the frame;
    an XY gantry positioned on the frame above the printing bed and comprising a plurality of brushless motors and a plurality of encoders;
    an extruder positioned on the frame; and
    an x-carriage positioned on the XY-gantry, the x-carriage comprising a high-flow-rate hot end, an air hose, and a filament tube in communication with the extruder, wherein the high-flow-rate hot end comprises a heat sink, a heater system and a nozzle;
    wherein the extruder is configured to pass filament through the filament tube to the high-flow-rate hot end for printing from the nozzle;
    wherein each of the plurality of brushless motors of the XY gantry is controlled by using field oriented control for closed loop positioning to achieve to print at high speeds with high precision using the plurality of encoders to track the location of the x-carriage;
    wherein the printer assembly has a volumetric flow rate ranging from 240 to 4800 cubic millimeters per second, and operates at a speed ranging from 1 meter per second to 5 meters per second.

11. The printer assembly according to claim 10 wherein the XY gantry further comprises a plurality of brushless motor controllers wherein the plurality of encoders provide positional feedback to the plurality of brushless motor controllers.

12. The printer assembly according to claim 10 further comprising a compressed air source mounted to the frame and in flow communication with the air hose of the x-carriage to flow compressed air directly below the nozzle during printing.

13. The printer assembly according to claim 10 wherein the high-flow rate hot end defines a melt zone having a length ranging from 80 millimeters to 160 millimeters.

14. The printer assembly according to claim 10 wherein the x-carriage further comprises a plurality of stabilizing rods that contact the high-flow-rate hot end at its center of mass to increase its stability.

15. A method for printing using a high speed fused deposition modeling (FDM) three-dimensional (3D) printer assembly, the method comprising:
    moving filament into an input channel of an extruder of a printer assembly, the extruder positioned on a frame of the printer assembly;
    compressing the filament between a timing belt and a groove of a passive wheel of the extruder;
    moving the filament from an output channel of the extruder through a filament tube to a high-flow-rate hot end of an x-carriage positioned on an XY gantry of the printer assembly;
    melting the filament in a melt zone of the high-flow-rate hot end of an x-carriage;
    positioning the x-carriage using a plurality of brushless motors of the XY gantry which are controlled by a plurality of brushless motor controllers using field oriented control for closed loop positioning to achieve to print at high speeds with high precision using a plurality of encoders to track the location of the x-carriage;
    printing the melted filament material from a large bore nozzle of the high-flow-rate hot end of the x-carriage at a volumetric flow rate ranging from 240 to 4800 cubic millimeters per second, and a speed ranging from 1 meter per second to 5 meters per second.

16. The method according to claim 15 further comprising flowing compressed air from an air tube below the nozzle.

17. The method according to claim 15 further comprising receiving positional feedback from the plurality of encoders at the plurality of brushless motor controllers.

18. The method according to claim 15 further comprising a compressed air source mounted to the frame and in flow communication with the air hose of the x-carriage to flow compressed air directly below the nozzle during printing.

19. The method according to claim 15 wherein the high-flow rate hot end defines a melt zone having a length ranging from 80 millimeters to 160 millimeters.

20. The method according to claim 15 wherein the x-carriage further comprises a plurality of stabilizing rods that contact the high-flow-rate hot end at its center of mass to increase its stability.

* * * * *